United States Patent [19]
Guo et al.

[11] Patent Number: 5,340,883
[45] Date of Patent: Aug. 23, 1994

[54] ORGANIC LIQUID ABSORBENT COMPOSITIONS BASED ON PHOSPHONIC ACID-CONTAINING POLYMERS AND DI- OR POLYAMINES

[75] Inventors: Shao H. Guo; Roger A. Grey, both of West Chester, Pa.

[73] Assignee: ARCO Chemical Technology, L.P., Greenville, Del.

[21] Appl. No.: 88,713

[22] Filed: Jul. 8, 1993

Related U.S. Application Data

[62] Division of Ser. No. 38,586, Mar. 26, 1993, Pat. No. 5,274,050, which is a division of Ser. No. 806,955, Dec. 12, 1991, Pat. No. 5,237,028.

[51] Int. Cl.$^5$ ............................ C08F 8/32; C08F 30/02
[52] U.S. Cl. ................................. 525/381; 525/374; 525/379; 525/382; 525/538; 526/277; 526/278
[58] Field of Search ................ 525/379, 381, 382, 538

[56] References Cited

U.S. PATENT DOCUMENTS 3,402,156  9/1968  Kramer ..................... 525/326.6
3,420,805  1/1969  Kramer ..................... 525/326.6

Primary Examiner—Joseph L. Schofer
Assistant Examiner—Fred Zitomer
Attorney, Agent, or Firm—Jonathan L. Schuchardt

[57] ABSTRACT

Compositions useful as absorbents for organic liquids are disclosed. A diamine or polyamine is reacted with a polymeric resin that contains phosphonic acid groups to produce the absorbent compositions of the invention. Because the polymeric resin component can be combined with the amine either before or after combination with the organic liquid, the absorbents of the invention can be used in many forms. The polymeric resin component can be processed into any desired form (shaped article, solution), and the di- or polyamine can then be added to generate the absorbent in situ. Unlike spent absorbent compositions of the prior art, those of the invention can be converted to pumpable liquids by heating or by adding a gel-breaking agent to liquify the gel. A useful absorbent is recovered from the liquid by precipitation or distillation.

5 Claims, No Drawings

ORGANIC LIQUID ABSORBENT COMPOSITIONS BASED ON PHOSPHONIC ACID-CONTAINING POLYMERS AND DI- OR POLYAMINES

This is a division of application Ser. No. 08/038,586, filed Mar. 26, 1993, now U.S. Pat. No. 5,274,050, which is a division of application Ser. No. 07/806,955, filed Dec. 12, 1991, now U.S. Pat. No. 5,237,028.

FIELD OF THE INVENTION

The invention relates to compositions useful as absorbents for organic liquids. The compositions, which form an insoluble gel when combined with an oil or an organic liquid, are the reaction products of a di- or polyamine and a polymeric resin that contains phosphonic acid groups.

BACKGROUND OF THE INVENTION

Compositions that can absorb organic liquids, especially from aqueous mixtures, are of considerable interest. Oil-absorbent compositions are described in U.S. Pat. No. 3,520,806. An alkylated styrene monomer, such as tert-butylstyrene, is polymerized in the presence of a free-radical initiator and a polyethylenically unsaturated compound such as divinylbenzene. Crosslinking from the difunctional monomer makes the composition insoluble in the organic liquid. When the polymer composition and organic liquid are combined, the polymer swells with many times its weight of the organic liquid, but remains insoluble.

Polymeric resins containing phosphonic acid groups are known in the art. Examples include styrene/1-phenylvinylphosphonic acid copolymers (*Plast. Massy*, No. 8 (1966) 24), crosslinked vinyl phosphonate copolymers (U.S. Pat. No. 3,726,839), and styrenic polymers that contain pendent phosphonate ester groups (*J. Polym. Sci. A, Polym. Chem. Ed.* 28 (1990) 227; 27 (1989) 3985). The reaction products of polymeric resins containing phosphonic acid groups with di- or polyamines and the use of such resins as absorbents for organic liquids have not been previously disclosed.

Previously known absorbents for organic liquids—typically the crosslinked alkylated styrene polymers described above—have limited utility because they are generally non-processable solids. A processable solid, i.e., one that can be thermally processed or dissolved in a solvent, is desirable because it can be processed before use into the most effective form (e.g., fiber, particle, solid shape) for a specific end use. A liquid absorbent or a solid absorbent that can be dissolved and used in liquid form would be preferred for some applications.

Another disadvantage of organic-liquid absorbents known in the art is that the spent absorbent, which is typically gel-like when swollen with an organic liquid, is not easy to process or transport. In addition, the organic liquid and absorbent polymer are not easily recovered from the spent absorbent, so the spent absorbent is typically buried or incinerated.

An ideal absorbent could be: (a) handled and used as either a processable solid or liquid, (b) transformed, when spent, from a gel to a pumpable, stirrable liquid, and (c) recycled to give back the organic liquid and a useful absorbent material, thus eliminating the need for costly waste treatment and disposal.

SUMMARY OF THE INVENTION

The invention is a composition useful for absorbing organic liquids. The composition comprises the reaction product of a diamine or a polyamine with a polymeric resin that contains phosphonic acid groups. The polymeric resin, which is typically soluble in organic liquids, reacts with a diamine or polyamine to give a remarkably effective organic-liquid absorbent.

The absorbents of the invention are versatile. Like conventional absorbents, those of the invention can be used as granular solids. Because the polymeric resin component can be combined with the di- or polyamine either before or after combination with the organic liquid to be absorbed, the absorbents of the invention can be used in many forms.

The polymeric resin component can be processed before use into the most effective form (e.g., fiber, particle, solid shape) for a specific end use. The polymeric resin can be used in solution for applications where decanting, pumping, or spraying is desired. The di- or polyamine can then be added to form the absorbent in situ.

Addition of the di- or polyamine to the polymeric resin/organic liquid mixture produces a gel. Unlike spent absorbents of the prior art, those of the invention can be transformed into pumpable, stirrable liquids by heating or by addition of a gel-breaking agent. In addition, the gel can be broken, and the absorbent polymer can often be recovered.

DETAILED DESCRIPTION OF THE INVENTION

The compositions of the invention are the reaction products of a diamine or a polyamine and a polymeric resin that contains phosphonic acid groups.

Diamines and polyamines useful in the invention include aliphatic, aromatic, and heterocyclic compounds containing more than one primary, secondary, or tertiary amine group. The diamine or polyamine may be, for example, ethylene diamine, 1,4-diaminobutane, 1,6-diaminohexane, 4-aminoaniline, diaminotoluenes, N,N,N',N'-tetramethylethylenediamine, 1,4-diaminocyclohexane, dipyridyls, 1,4-diazabicyclo[2.2.2]octane (DABCO), and the like. Polymeric materials that contain more than one residual amine group are also suitable. Thus, amine-terminated polyethers such as "Jeffamine" polyethers (products of Texaco Chemical Co.), amine-terminated polystyrenes, and amine-terminated polybutadienes, are suitable. Mixtures of amines can be used.

The amount of di- or polyamine required depends on the molecular weight and functionality of the amine used, but is typically within the range of about 2 to about 70 weight percent based on the total weight of the absorbent composition. A preferred range is from about 5 to about 50 weight percent.

Suitable polymeric resins are all polymeric resins that contain pendent phosphonic acid

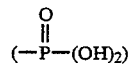

groups. In addition to the phosphonic acid groups, the polymeric resin may also contain pendent phosphonate mono- or diester groups. However, polymeric resins that contain only phosphonate monoester and/or diester groups are not suitable.

Suitable polymeric resins include polymers of vinyl phosphonic acids and copolymers of vinyl phosphonic acids with ethylenically unsaturated monomers. Suitable ethylenically unsaturated monomers include, but are not limited to, vinyl aromatic monomers (e.g., styrene, tert-butylstyrene), conjugated dienes (isoprene, 1,3-butadiene), vinyl phosphonate mono- and diesters, vinyl halides, vinylidene halides, alpha-olefins (ethylene, propylene), vinyl esters of carboxylic acids (vinyl acetate), aryl and alkyl esters of acrylic and methacrylic acid (methyl methacrylate, benzyl acrylate), acrylic and methacrylic acids, ethylenically unsaturated dicarboxylic acids (maleic acid), their anhydrides (maleic anhydride), and their mono- and dialkyl esters (diethyl maleate), amides of ethylenically unsaturated carboxylic acids (acrylamide, methacrylamide), nitriles of ethylenically unsaturated carboxylic acids (acrylonitrile, methacrylonitrile), and alkyl vinyl ethers (methyl vinyl ether), and the like, and mixtures thereof. Polyethylene phosphonic acids, polystyrene phosphonic acids, and the like are suitable. Also suitable are polymeric resins containing phosphonic acids such as those described by Cabasso et al. (see *J. Polym. Sci. A, Polym. Chem. Ed.* 28 (1990) 227; 27 (1989) 3985).

The amount of polymeric resin used in the invention depends on many factors, including the equivalent weights of the polymeric resin and the diamine or polyamine. Generally, the amount of polymeric resin used will be within the range of about 30 to about 98 weight percent based on the total weight of the absorbent composition. A preferred range is from about 50 to about 95 weight percent.

Preferred polymeric resins of the invention are copolymers of a vinyl phosphonic acid and a vinyl aromatic monomer. Preferably, the vinyl phosphonic acid has the general structure:

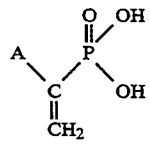

in which A is a monovalent radical selected from the group consisting of hydrogen and $C_1$–$C_{30}$ alkyl, aryl, and aralkyl. Preferably, A is phenyl.

Suitable vinyl phosphonic acids include, but are not limited to, vinylphosphonic acid, 1-phenylvinyl phosphonic acid, halogenated 1-phenylvinyl phosphonic acids, 1-methylvinyl phosphonic acid, 1-ethylvinyl phosphonic acid, and the like, and mixtures thereof.

The amount of vinyl phosphonic acid is not critical. It is preferred to use at least about 1% by weight based on the total weight of the polymeric resin. A preferred amount of vinyl phosphonic acid incorporated in the copolymer is an amount within the range of about 1 to about 40 weight percent based on the weight of the polymeric resin.

A vinyl aromatic monomer is preferably copolymerized with the vinyl phosphonic acid. Useful vinyl aromatic monomers include all aromatic ring-containing compounds that have a vinyl or α-substituted vinyl group attached to the aromatic ring. Suitable vinyl aromatic compounds include, but are not limited to, styrene, alkyl-substituted styrenes, α-methylstyrene, alkyl-substituted α-methylstyrenes, tert-butylstyrenes, nuclear methyl styrenes, halogenated styrenes, vinyl naphthalenes, and the like, and mixtures thereof. Alkyl-substituted styrenes, such as tert-butylstyrene, are preferred.

The amount of vinyl aromatic monomer used is preferably greater than about 60% by weight based on the weight of the polymeric resin. A particularly preferred range is from about 80 to about 98 weight percent.

In one embodiment of the invention, a vinyl phosphonate mono-or diester is copolymerized with the vinyl aromatic monomer. Some or all of the phosphonate ester groups of the resulting copolymer are then hydrolyzed to give a copolymer that contains residual phosphonic acid

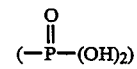

functionality This copolymer is then combined with a di- or polyamine to give an absorbent composition of the invention.

Optionally, the compositions of the invention include a rubber. The rubber may simply be mixed or blended with the polymeric resin and diamine or polyamine in any desired manner to produce the rubber-modified composition. Often, however, the rubber cannot be blended intimately with the polymeric resin, and it is preferred to chemically graft the rubber onto the resin.

Suitable rubbers include, but are not limited to, polybutadiene, styrene-butadiene rubbers, EPDM, polyisobutylene, and the like. Any desired amount of rubber can be used. An amount within the range of about 5 to about 50 weight percent based on the amount of polymeric resin is preferred.

In one embodiment of the invention, a rubber is included in the copolymerization of a vinyl phosphonic acid and a vinyl aromatic monomer. The resulting rubber-grafted copolymer is reacted with a diamine or a polyamine to produce an absorbent composition.

The compositions of the invention are conveniently prepared by combining the di- or polyamine and the polymeric resin in the presence of an organic solvent. Examples of suitable organic compounds are aliphatic and aromatic hydrocarbons (hexane, toluene, and the like), halogenated hydrocarbons (dichloromethane, chlorobenzene, and the like), ketones, esters, ethers (tetrahydrofuran), glycol ethers, glycol ether esters, mineral oils, crude oils, and the like, and mixtures thereof. While the polymeric resin component is soluble in the organic solvent, the reaction product of the amine and polymeric resin is an insoluble composition that has a high affinity for the organic solvent. A gel phase quickly separates from any excess organic solvent. A useful absorbent composition can be isolated by separating the gel and heating it under vacuum to remove the organic solvent used in its preparation.

The absorbents of the invention are versatile. Absorbent compositions of the prior art that are crosslinked during preparation, which are non-processable, must be handled as solid particles or powders. Solid particles are useful for some applications such as cartridge-type filters (see, for example, U.S. Pat. No. 4,059,528), but there are many other applications where a processable resin that can be converted in situ to an absorbent would be desirable.

The polymeric resin component can be processed into fibers, films, or shapes before reaction with the diamine or polyamine. Thus, the resin can be tailored to fit a particular absorption problem. In contrast, the crosslinked oil-absorbent compositions known in the art usually cannot be thermally processed into other useful forms.

Absorbents of the invention need not be prepared in advance. If desired, for example, a solution of the polymeric resin can be sprayed directly onto an oil spill where it will be rapidly absorbed by the oil. Subsequent application of the di- or polyamine to the spill gives the absorbent composition in situ, and turns the oil phase into a gel.

Prior-art absorbents, when spent, are not easily converted to liquids, so they cannot be transported with pumps and pipelines. The spent absorbents are usually collected and buried or incinerated, thus wasting both the absorbent and absorbed liquid.

In contrast, the spent compositions of the invention can be transformed easily from the gel form back to an easily processed liquid. This is accomplished either by heating the gel to a temperature above which the gel breaks down and forms a free-flowing liquid. Alternatively, a gel-breaking agent can be added to the gel to obtain a pumpable liquid. These methods are generally not effective with the irreversibly crosslinked absorbents commonly known in the art.

The spent absorbent compositions of the invention can be heated to convert the gel to a liquid form. The temperature required to convert the gel to a liquid will depend on many factors, including the composition and molecular weights of the diamine and polymeric resin components. Generally, this temperature will be within the range of about 60° C. to about 150° C. Once the composition is liquified, the material is easily pumped or stirred as desired, making pipeline transfer feasible. Since the liquid can be stirred, distillation to separate the organic liquid from the absorbent is also possible. Thus, a composition may be used to clean up a spill of an organic liquid, the gel can be isolated, and the product can be converted to a liquid form for easy transfer and disposal or separation.

Spent absorbent compositions of the invention can also be converted from gel to liquid form by adding a gel-breaking agent. The effectiveness of the gel-breaking agent will depend on the structure of the absorbent composition and on the nature of the absorbed organic liquid. Suitable gel-breaking agents include, but are not limited to, protic acids, water, aqueous acids and bases, and aqueous salt solutions. Suitable protic acids include mineral acids, carboxylic acids, sulfonic acids, and halogenated carboxylic and sulfonic acids. Specific examples of suitable protic acids include, but are not limited to, hydrochloric acid, phosphoric acid, sulfuric acid, formic acid, acetic acid, propionic acid, benzoic acid, chloroacetic acid, dichloroacetic acid, trifluoroacetic acid, methanesulfonic acid, trifluoromethanesulfonic acid, and the like, and mixtures thereof.

When nonpolar organic liquids such as toluene and hexane are absorbed in the gel, acids such as acetic acid and hydrochloric acid can be used as effective gel-breaking agents. Addition of the acid to the gel converts the gel to a liquid. The absorbent polymer can be recovered from the liquid by any suitable means, such as distillation or solvent precipitation. A convenient way to isolate the absorbent polymer from the gel is to acidify, then add an aliphatic alcohol such as methanol to the liquid to precipitate the absorbent polymer. After filtration and vacuum drying, a useful absorbent is isolated. The usefulness of the recovered absorbent may depend on the relative strength of the acid used. The use of an acid having a pKa greater than about 3 allows isolation of a polymer that retains its absorbent properties. When an acid having a pKa less than about 3 is used, a polymeric resin is obtained which must be treated with a di- or polyamine to regain the absorbent properties. This concept is illustrated in Examples 26 and 27.

When a relatively polar organic liquid such as tetrahydrofuran is absorbed in the gel, aqueous gel-breaking agents become effective. Even water may effectively break a gel that contains THF (see Example 28). As shown in Comparative Examples 30 and 31, however, water and dilute aqueous sodium hydroxide are ineffective as gel-breaking agents when toluene is the absorbed organic liquid.

The following examples merely illustrate the invention. Those skilled in the art will recognize numerous variations that are within the spirit of the invention and scope of the claims.

EXAMPLES 1-8

Examples 1-8 illustrate the preparation of the polymeric resin component of the compositions of the invention. A styrenic/1-phenylvinyl phosphonic acid copolymer based on either styrene or tert-butylstyrene is shown (Copolymers I-VIII). The copolymers are prepared, as detailed below, by aqueous suspension copolymerization in the presence of a phase-transfer catalyst. Compositions and properties of the resins are summarized in Table 1.

Preparation of Styrenic/1-Phenylvinyl phosphonic acid Copolymers (Copolymers I-VIII)

To a 12-oz. glass reaction bottle is added a styrenic monomer (100 g), tert-butyl perbenzoate (0.12 wt. % based on the amount of total monomer), benzoyl peroxide (0.12 wt. % based on the amount of total monomer), partially hydrolyzed polyacrylamide ("PAM 8173" suspending agent, a product of Nalco, 0.50 wt. % based on the amount of total monomer), tetra-n-butylammonium bromide (6.0 mole percent based on the amount of 1-phenylvinyl phosphonic acid used), distilled water (100 g), and 1-phenylvinyl phosphonic acid (4.5–40 g, amount shown in Table 1). The bottle is capped and tumbled end-over-end in a bottle polymerizer at 115° C. for 6 hours, then at 135° C. for another 6 hours. The beads are separated by centrifugation, washed with water, and dried under vacuum (1 mm) at 60° C. Phosphorus content (by elemental analysis) and weight average molecular weight (by gel-permeation chromatography) are shown in Table 1.

TABLE 1

Styrenic/Vinyl phosphonate Copolymer Compositions

| Example # | Copolymer # | Styrenic Monomer | PVPA g | PolyBD g | Phosphorus Content Calc. wt. % | Phosphorus Content Found wt. % | Weight Ave. Mol. Wt. |
|---|---|---|---|---|---|---|---|
| 1 | I | styrene | 5.0 | — | 0.8 | 0.7 | $3.9 \times 10^5$ |

TABLE 1-continued

| | | Styrenic/Vinyl phosphonate Copolymer Compositions | | | | | |
|---|---|---|---|---|---|---|---|
| Example # | Copolymer # | Styrenic Monomer | PVPA g | PolyBD g | Phosphorus Content | | Weight Ave. Mol. Wt. |
| | | | | | Calc. wt. % | Found wt. % | |
| 2 | II | styrene | 6.8 | — | 1.0 | 0.6 | $3.3 \times 10^5$ |
| 3 | III | styrene | 9.2 | — | 1.4 | 1.2 | $3.0 \times 10^5$ |
| 4 | IV | styrene | 12 | — | 1.8 | 1.3 | $1.7 \times 10^5$ |
| 5 | V | styrene | 40 | — | 5.0 | 3.5 | $1.1 \times 10^5$ |
| 6 | VI | t-butylstyrene | 4.5 | — | 0.7 | 0.3 | $3.7 \times 10^5$ |
| 7 | VII | t-butylstyrene | 6.0 | — | 0.9 | 0.6 | — |
| 8 | VIII | t-butylstyrene | 40 | — | 4.5 | 1.4 | $2.5 \times 10^5$ |
| 9 | IX | styrene | 40 | 10 | 4.5 | 2.7 | $2.4 \times 10^5$ |
| 10 | X | t-butylstyrene | 40 | 10 | 4.5 | 1.3 | $2.2 \times 10^5$ |
| C26 | XI | styrene | ** | — | 1.4 | 1.2 | $0.8 \times 10^5$ |

PVPA = 1-phenylvinyl phosphonic acid
**1-phenylvinyl-1-monomethylphosphonate (9.8 wt. %) used in place of PVPA
PolyBD = "Diene 35" polybutadiene rubber (product of Firestone)
Calc. wt. % Phosphorus = amount expected from 100% incorporation of phosphonic acid monomer.
Found wt. % Phosphorus = amount of phosphorus found in polymer by elemental analysis
Weight ave. mol. wt. determined by gel-permeation chromatography using polystyrene calibration standards.

EXAMPLES 9-10

Examples 9-10 illustrate the preparation of polybutadiene rubber-grafted polymeric resins by mass-grafting copolymerization (Copolymers IX and X). Table 1 summarizes the polymeric resin compositions and properties.

Preparation of Rubber-Grafted Styrenic/1-Phenylvinyl phosphonic acid Copolymers (IX and X)

To a 12-oz. glass reaction bottle is added a styrenic monomer (100 g), tert-butyl perbenzoate (0.12 g), benzoyl peroxide (0.12 g), 1-phenylvinyl phosphonic acid (40 g), and "Diene 35" polybutadiene (product of Firestone, 10 g). The bottle is capped and tumbled end-over-end in a bottle polymerizer at 115° C. for 6 hours, then at 135° C. for another 6 hours. The product is dissolved in toluene, and isopropyl alcohol is added to precipitate the polymer. The product is filtered, and dried under vacuum (1 mm) at 80° C. Phosphorus content and weight average molecular weight are shown in Table 1.

EXAMPLES 11-22

Examples 11-22 show how the polymeric resins can be combined with 1,6-diaminohexane or "Jeffamine D2000" amine-terminated polyether to produce compositions useful as organic-liquid absorbents. Absorbency results are summarized in Table 2. The compositions of the invention typically absorb many times their weight in organic solvents or crude oil.

Preparation of Absorbent Copolymers Example 11

A toluene solution containing 10% by weight of copolymer I (see Table 1) is prepared. 1,6-Diaminohexane (1.5 g) is added to 100 g of the toluene solution with stirring at room temperature. A gel forms within about 0.5 h. After stirring for 1 h, the gel is spread onto an aluminum plate, is air-dried in a hood for 12 h, and is dried under vacuum (1 mm) at 80° C. for an additional 12 h. Absorbency in various organic liquids is tested, and the results appear in Table 2.

EXAMPLE 12

A toluene solution containing 10% by weight of copolymer II (see Table 1) is prepared. 1,6-Diaminohexane (0.5 g) is added to 100 g of the toluene solution with stirring at 50° C. A gel forms within about 0.5 h. After stirring for 1 h, the gel is spread onto an aluminum plate, is air-dried for 12 h, and is dried under vacuum (1 mm) at 100° C. for an additional 12 h. Absorbency results appear in Table 2.

EXAMPLE 13

A solution is prepared from copolymer III (45 g) and toluene (400 g). 1,6-Diaminohexane (3.0 g) is added to this solution with stirring at room temperature. Within 5 minutes, a gel forms, and additional toluene (1000 g) is added. Filtration of the mixture through a mesh cloth gives 1400 g of gel having an in situ absorbency of 30.1 g/g. The gel is spread onto an aluminum plate, air-dried for 12 h, and dried under vacuum (1 mm) at 80° C. for

TABLE 2

| | Absorbency of Diamine-Treated Styrenic/PVPA Copolymers | | | | | | | | | | | |
|---|---|---|---|---|---|---|---|---|---|---|---|---|
| Example # | 11 | 12 | 13 | 14 | 15 | 16 | 17 | 18 | 19 | 20 | 21 | 22 |
| Copolymer # | I | II | III | III | III | IV | V | VI | VII | VIII | IX | X |
| Diamine | DAH | DAH | DAH | DAH | Jeff | DAH | DAH | DAH | DAH | DAH | DAH | DAH |
| Wt. % diamine | 15 | 5.0 | 6.7 | 4.4 | 53 | 10 | 5.0 | 6.0 | 5.0 | 5.0 | 12.5 | 10 |
| Absorbency (g/g) | | | | | | | | | | | | |
| $CH_2Cl_2$ | 24.1 | 32.1 | 24.1 | 32.8 | 16.1 | 34.4 | 8.4 | — | — | — | 9.6 | — |
| THF | 16.7 | 20.0 | 13.3 | 15.4 | 10.3 | 20.8 | 6.0 | 13.0 | 10.6 | 6.2 | 6.2 | 7.5 |
| toluene | 12.2 | 14.3 | 13.5 | 16.5 | 9.0 | 12.5 | 4.3 | 9.4 | 9.8 | 6.6 | 5.8 | 7.9 |
| styrene | 14.0 | 13.3 | 15.4 | 14.0 | 9.5 | 17.2 | 4.0 | — | — | — | 7.5 | — |
| cyclohexane | 2.0 | 2.0 | 3.9 | 2.5 | 2.9 | 2.0 | 1.2 | 10.8 | 9.6 | 6.2 | 2.5 | 6.8 |
| hexane | — | — | — | — | — | — | — | 8.6 | 8.8 | 4.6 | — | 5.0 |
| heptane | — | — | — | — | — | — | — | 7.0 | 9.4 | 4.4 | — | 6.4 |
| crude oil | — | — | — | — | — | — | — | 7.2 | 10.0 | 4.0 | — | 7.6 |

DAH = 1,6-diaminohexane; Jeff = "Jeffamine D2000" amine-terminated polyol (product of Texaco Chemical Co.)
—: absorbency not tested an additional 12 h. Absorbency results appear in Table 2.

EXAMPLE 14

A toluene solution containing 10% by weight of copolymer III is prepared. 1,6-Diaminohexane (0.5 g) is added with stirring at room temperature to 100 g of the toluene solution. A gel forms within about 0.5 h. After 1 h of stirring, the gel is spread onto an aluminum plate, is air-dried for 12 h, and is dried under vacuum (1 mm) at 100° C. for 12 h. Absorbency results appear in Table 2.

EXAMPLE 15

A toluene solution containing 10% by weight of copolymer III is prepared. "Jeffamine D2000" (6.0 g, product of Texaco Chemical Co.) is added with stirring at room temperature to 100 g of the toluene solution. A gel forms within about 30 seconds. After 1 h of stirring, the gel is spread onto an aluminum plate, air-dried for 12 h, and dried under vacuum (1 mm) at 80° C. for 12 h. Absorbency results appear in Table 2.

EXAMPLE 16

A toluene solution containing 10% by weight of copolymer IV is prepared. 1,6-Diaminohexane (1.0 g) is added with stirring at room temperature to 100 g of the toluene solution. A gel forms within about 1 min. After stirring for about 1 h, the gel is spread onto an aluminum plate, air-dried for 12 h, and dried under vacuum (1 mm) at 80° C. for 12 h. Absorbency results appear in Table 2.

EXAMPLE 17

A toluene solution containing 10% by weight of copolymer V is prepared. 1,6-Diaminohexane (0.5 g) is added with stirring at room temperature to 100 g of the toluene solution. A gel forms within about 30 seconds. After stirring for about 1 h, the gel is spread onto an aluminum plate, air-dried for 12 h, and dried under vacuum (1 mm) at 80° C. for 12 h. Absorbency results appear in Table 2.

EXAMPLE 18

A toluene solution containing 10% by weight of copolymer VI is prepared. 1,6-Diaminohexane (0.6 g) is added with stirring at 50° C. to 100 g of the toluene solution. A gel forms within about 50 min. After stirring for about 1 h, the gel is spread onto an aluminum plate, air-dried for 12 h, and dried under vacuum (1 mm) at 80° C. for 12 h. Absorbency results appear in Table 2.

EXAMPLE 19

A solution is prepared by dissolving copolymer VII (20 g) in cyclohexane (350 g) at 70° C. 1,6-Diaminohexane (1.0 g) is added to the cyclohexane solution. A gel forms within about 30 min. upon cooling of the solution. Filtration through a mesh cloth followed by washing with cyclohexane gives about 320 g of gel having an in situ absorbency of 15.0 g/g. The gel is spread onto an aluminum plate, air-dried for 12 h, and dried under vacuum (1 mm) at 80° C. for 12 h. Absorbency results appear in Table 2.

EXAMPLE 20

A toluene solution containing 10% by weight of copolymer VIII is prepared. 1,6-Diaminohexane (0.5 g) is added with stirring at 50° C. to 100 g of the toluene solution. A gel forms within about 50 min. After stirring for about 1 h, the gel is spread onto an aluminum plate, air-dried for 12 h, and dried under vacuum (1 mm) at 80° C. for 12 h. Absorbency results appear in Table 2.

EXAMPLE 21

A toluene solution containing 10% by weight of copolymer IX is prepared. 1,6-Diaminohexane (1.25 g) is added with stirring at 50° C. to 100 g of the toluene solution. A gel forms within about 1 min. After stirring for about 1 h, the gel is spread onto an aluminum plate, air-dried for 12 h, and dried under vacuum (1 mm) at 80° C. for 12 h. Absorbency results appear in Table 2.

EXAMPLE 22

A toluene solution containing 10% by weight of copolymer X is prepared. 1,6-Diaminohexane (1.0 g) is added with stirring at 50 C. to 100 g of the toluene solution. A gel forms within about 2 min. After stirring for about 1 h, the gel is spread onto an aluminum plate, air-dried for 12 h, and dried under vacuum (1 mm) at 80° C. for 12 h. Absorbency results appear in Table 2.

Comparative Example 23

Preparation of
1-Phenylvinyl-1-monomethylphosphonate/Styrene Copolymer (Copolymer XI)

To a 12-oz. glass reaction bottle is added 1-phenylvinyl-1-dimethylphosphonate (6.5 g), sodium hydroxide (1.2 g), and deionized water (60 g). After two hours of stirring, 37% hydrochloric acid (3.0 g) is added. Partially hydrolyzed polyacrylamide ("PAM 8173" suspending agent, a product of NALCO, 0.13 g) and a premixed solution of styrene (60 g), benzoyl peroxide (0.18 g), and tert-butyl perbenzoate (0.12 g) are added to the phosphonate solution. The bottle is purged with nitrogen, capped, and tumbled end-over-end in a polymerizer at 90° C. for 6 h, and at 130° C. for another 6 h. The beads are separated by centrifugation, washed with water, and dried under vacuum (1 mm) at 80° C. Phosphorus content (by elemental analysis) and weight average molecular weight (by gel-permeation chromatography) are shown in Table 1. This polymer has pendent phosphonate groups of the structure:

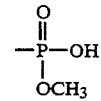

Comparative Example 24

Reaction of Copolymer XI with 1,6-Hexanediamine

A 10 wt.% solution of Copolymer XI in toluene is prepared. 1,6-Diaminohexane (1.5 g) is added to 100 g of the toluene solution with stirring at 50° C. No gel forms, even after 5 hours of stirring. This example demonstrates the criticality of the phosphonic diacid functionality for forming absorbent polymers.

Comparative Example 25

Reaction of Copolymer VII with n-Hexylamine

A 10 wt.% solution of Copolymer VII in cyclohexane is prepared. n-Hexylamine (1.0 g) is added to 100 g of the cyclohexane solution with stirring at 60° C. No gel forms, even after stirring and cooling to room temperature over 5 hours. This example demonstrates that the reaction product of a polymeric resin with a monofunctional amine is not a suitable absorbent for organic liquids.

EXAMPLES 26–29

Examples 26–29 show how useful absorbent compositions can be recovered from spent absorbents by treating the spent absorbent with a gel-breaking agent.

EXAMPLE 26

Recovery of Oil-Absorbent Polymer Acetic acid as Gel-breaking Agent

A portion of the absorbent copolymer prepared in Example 13 (1.0 g) and toluene (15 g) are charged to a 4-ounce bottle. The absorbent polymer swells within 10 min. Glacial acetic acid (1.0 g) is added to the gel with stirring. The gel immediately becomes a clear liquid. Methanol (100 mL) is added in one portion. The polymer, which precipitates, is filtered and dried under vacuum at 60° C. Yield of polymer: 0.9 g. The polymer is insoluble in toluene, but swells with a measured absorbency of 14.5 g/g.

EXAMPLE 27

Recovery of Oil-Absorbent Polymer Hydrochloric acid as Gel-breaking Agent Recovery of Polymeric Resin and Regeneration of Absorbent A portion of the absorbent copolymer prepared in Example 13 (1.0 g) and toluene (13.5 g) are charged to a 4-ounce bottle. The absorbent polymer swells within 10 min. Hydrochloric acid (37%) (1.0 g) is added to the gel with stirring. The gel immediately becomes a cloudy liquid. Methanol (100 mn) is added in one portion. The polymer, which precipitates, is filtered and dried under vacuum at 60° C. Yield: 0.82 g. The polymer is soluble in toluene, and gives a clear solution. 1,6-Diaminohexane (0.2 g) is added to a solution of the polymer in toluene (20 g). A gel forms immediately. Absorbency of the gel is 17.0 g/g.

EXAMPLE 28

Recovery of Oil-Absorbent Polymer Water as Gel-breaking Agent

A portion of the absorbent copolymer prepared in Example 13 (1.0 g) and tetrahydrofuran (10 g) are charged to a 4-ounce bottle. The absorbent polymer swells within 5 min. Distilled water (1.0 g) is added with stirring to the gel. The gel dissolves within 10 min. Precipitation with methanol, filtration, and drying as described above results in 0.8 g polymer. The product is insoluble in THF, but swells with an absorbency of 10 g/g.

EXAMPLE 29

Recovery of Oil-Absorbent Polymer Aqueous Sodium Hydroxide as Gel-Breaking Agent The procedure of Example 28 is followed, except that 20% aqueous sodium hydroxide solution is used in place of the distilled water. The gel dissolves within 10 min. Isolation of the polymer in the usual way gives 0.9 g polymer. The polymer is insoluble in THF, but swells with an absorbency of 10 g/g.

Comparative Examples 30 and 31

Comparative Examples 30–31 show that the success of the gel-breaking agent will depend upon which organic liquid is present in the gel. Water and aqueous base are capable of breaking a gel based on THF, but not one based on toluene.

Comparative Example 30

A portion of the absorbent copolymer prepared in Example 13 (1.0 g) and toluene (13.5 g) are charged to a 4-ounce bottle. The absorbent polymer swells within 10 min. Distilled water (1.0 g) is added with stirring to the gel, but the gel does not break.

Comparative Example 31

The procedure of Comparative Example 30 is repeated, except that 20% aqueous sodium hydroxide solution is used in place of distilled water. As in Comparative Example 30, the gel does not break.

Absorbency Testing Procedure

Absorbency (grams of solvent absorbed per gram of copolymer) is determined as follows. The crosslinked copolymer (1.0 g) is weighed into a 50-mL bottle. An organic liquid (50 g) is added, the bottle is capped, and the mixture is allowed to soak for 1 h (solvents) or overnight (crude oil). Free solvent or oil is decanted from the bottle, and the sample is reweighed. The weight of the gel sample minus 1 g equals the absorbency in g solvent absorbed/g sample.

We claim:

1. A method of producing an organic-liquid absorbent, said method comprising:
   (a) reacting a polyamine with a polymeric resin that contains phosphonic acid groups in the presence of an organic solvent selected from the group consisting of aliphatic and aromatic hydrocarbons, halogenated hydrocarbons, ketones, esters, ethers, glycol ethers, glycol ether esters, mineral oils, and crude oils, to produce an insoluble gel;
   (b) separating the insoluble gel from any excess organic solvent; and
   (c) heating the insoluble gel under vacuum to remove the organic solvent and produce the organic-liquid absorbent;
   wherein the polyamine is used in an amount within the range of about 2 to about 70 weight percent, and the polymeric resin is used in an amount within the range of about 30 to about 98 weight percent based on the total weight of the organic-liquid absorbent.

2. The method of claim 1 wherein the polymeric resin is selected from the group consisting of vinyl phosphonic acid polymers, polyethylene phosphonic acids, polystyrene phosphonic acids, and copolymers of vinyl phosphonic acids with ethylenically unsaturated monomers.

3. The method of claim 1 wherein the polyamine and polymeric resin are reacted in the presence of a rubber selected from the group consisting of polybutadiene, styrene-butadiene rubbers, EPDM, and polyisobutylene in an amount within the range of about 5 to about 50 weight percent based on the amount of polymeric resin.

4. The method of claim 1 wherein the polymeric resin is prepared by copolymerizing a vinyl phosphonic acid and a vinyl aromatic monomer in the presence of a rubber selected from the group consisting of polybutadiene, styrene-butadiene rubbers, EPDM, and polyisobutylene.

5. A method of producing an organic-liquid absorbent, said method comprising:

(a) preparing a polymeric resin that contains phosphonic acid groups by copolymerizing a vinyl phosphonic acid and a vinyl aromatic monomer in the presence of from about 5 to about 50 weight percent based on the amount of polymeric resin of a rubber selected from the group consisting of polybutadiene, styrene-butadiene rubbers, EPDM, and polyisobutylene;

(b) reacting a polyamine with the polymeric resin in the presence of an organic solvent selected from the group consisting of aliphatic and aromatic hydrocarbons, halogenated hydrocarbons, ketones, esters, ethers, glycol ethers, glycol ether esters, mineral oils, and crude oils, to produce an insoluble gel;

(c) separating the insoluble gel from any excess organic solvent; and (d) heating the insoluble gel under vacuum to remove the organic solvent and produce the organic-liquid absorbent;

wherein the polyamine is used in an amount within the range of about 2 to about 70 weight percent, and the polymeric resin is used in an amount within the range of about 30 to about 98 weight percent based on the total weight of the organic-liquid absorbent.

* * * * *